(12) United States Patent
Kanade et al.

(10) Patent No.: US 10,453,077 B2
(45) Date of Patent: Oct. 22, 2019

(54) CONTEXT-BASED ASSIGNMENT OF CUSTOMER SERVICE AGENTS ASSOCIATED WITH DOCUMENT VIEWING SECTIONS

(71) Applicant: Avaya Inc., Basking Ridge, NJ (US)

(72) Inventors: Rajesh Kanade, Erandwane Pune (IN); Jitendra Wadhwa, Magarpatta (IN)

(73) Assignee: Avaya, Inc., Santa Clara, CA (US)

( * ) Notice: Subject to any disclaimer, the term of this patent is extended or adjusted under 35 U.S.C. 154(b) by 0 days.

(21) Appl. No.: 15/616,164

(22) Filed: Jun. 7, 2017

(65) Prior Publication Data
US 2018/0357648 A1    Dec. 13, 2018

(51) Int. Cl.
| | |
|---|---|
| *G06Q 30/00* | (2012.01) |
| *G06Q 10/10* | (2012.01) |
| *G06F 16/958* | (2019.01) |
| *G06F 16/955* | (2019.01) |
| *G06F 17/22* | (2006.01) |
| *G06F 3/0488* | (2013.01) |
| *G06Q 30/06* | (2012.01) |

(52) U.S. Cl.
CPC ......... *G06Q 30/018* (2013.01); *G06F 16/958* (2019.01); *G06F 16/9558* (2019.01); *G06F 17/2247* (2013.01); *G06Q 10/107* (2013.01); *G06F 3/0488* (2013.01); *G06Q 30/0609* (2013.01); *G06Q 30/0613* (2013.01); *G06Q 30/0617* (2013.01)

(58) Field of Classification Search
CPC .............. G06F 3/0488; G06F 17/2247; G06F 17/30882; G06F 17/3089; G06Q 30/018; G06Q 10/1076

USPC ......................................................... 715/255
See application file for complete search history.

(56) References Cited

U.S. PATENT DOCUMENTS

| | | | |
|---|---|---|---|
| 7,076,533 B1 * | 7/2006 | Knox .................... | H04L 51/34 709/217 |
| 7,936,867 B1 | 5/2011 | Hill et al. | |
| 8,644,487 B2 | 2/2014 | Erhart et al. | |
| 9,148,512 B1 * | 9/2015 | Kumar ............... | H04M 3/5232 |
| 2006/0190344 A1 * | 8/2006 | Sang ...................... | G06Q 30/06 706/50 |
| 2007/0005762 A1 * | 1/2007 | Knox ................... | G06Q 10/107 709/224 |
| 2009/0119606 A1 | 5/2009 | Gilbert | |
| 2011/0066692 A1 * | 3/2011 | Ciancio-Bunch .... | G06Q 10/107 709/206 |
| 2013/0030945 A1 * | 1/2013 | Polt ....................... | G06Q 20/12 705/26.5 |
| 2014/0314215 A1 * | 10/2014 | Duva .................. | G06Q 30/0202 379/88.01 |
| 2016/0044083 A1 * | 2/2016 | Galloway .............. | H04L 67/02 709/217 |
| 2016/0140635 A1 * | 5/2016 | Devageorge ........... | H04W 4/21 705/26.41 |

(Continued)

*Primary Examiner* — Cesar B Paula
*Assistant Examiner* — Luu-Phuong T Nguyen
(74) *Attorney, Agent, or Firm* — Stevens & Showalter LLP

(57) ABSTRACT

A computerized system determines when a viewer is viewing a certain portion of an electronic document. Depending on the portion of the document being viewed, the system determines whether various agents are available to assist the viewer and provides options to the viewer for communicating with one or more of the agents.

20 Claims, 16 Drawing Sheets

(56) References Cited

U.S. PATENT DOCUMENTS

2016/0198509 A1\* 7/2016 Hayes, Jr. ........... H04W 76/023
                                                      370/329
2017/0140415 A1\* 5/2017 Jamison ............. G06Q 30/0242
2017/0142125 A1\* 5/2017 Lim .................... G06F 21/6218

\* cited by examiner

CONTEXT-BASED ASSIGNMENT OF CUSTOMER SERVICE AGENTS ASSOCIATED WITH DOCUMENT VIEWING SECTIONS

BACKGROUND

Field of the Invention

The present disclosure relates generally to communications and, more particularly, to context-based assignment of customer service agents for communications with customers.

Description of Related Art

Customer service has become critical for almost every industry. With the proliferation of communications media, various industries have expanded options for providing customer service. For example, in addition to telephone customer support, various industries provide email support and online chat support to resolve issues for customers. Because of the importance of customer service, there are ongoing efforts to improve customer service support.

BRIEF SUMMARY

The present disclosure provides a computerized system that determines when a particular segment (or section) of an electronic document is being viewed. Depending on the segment being viewed, the system determines availability of various agents and provides options to an email recipient for communicating with one or more available agents.

DETAILED DESCRIPTION

Figure 1A:
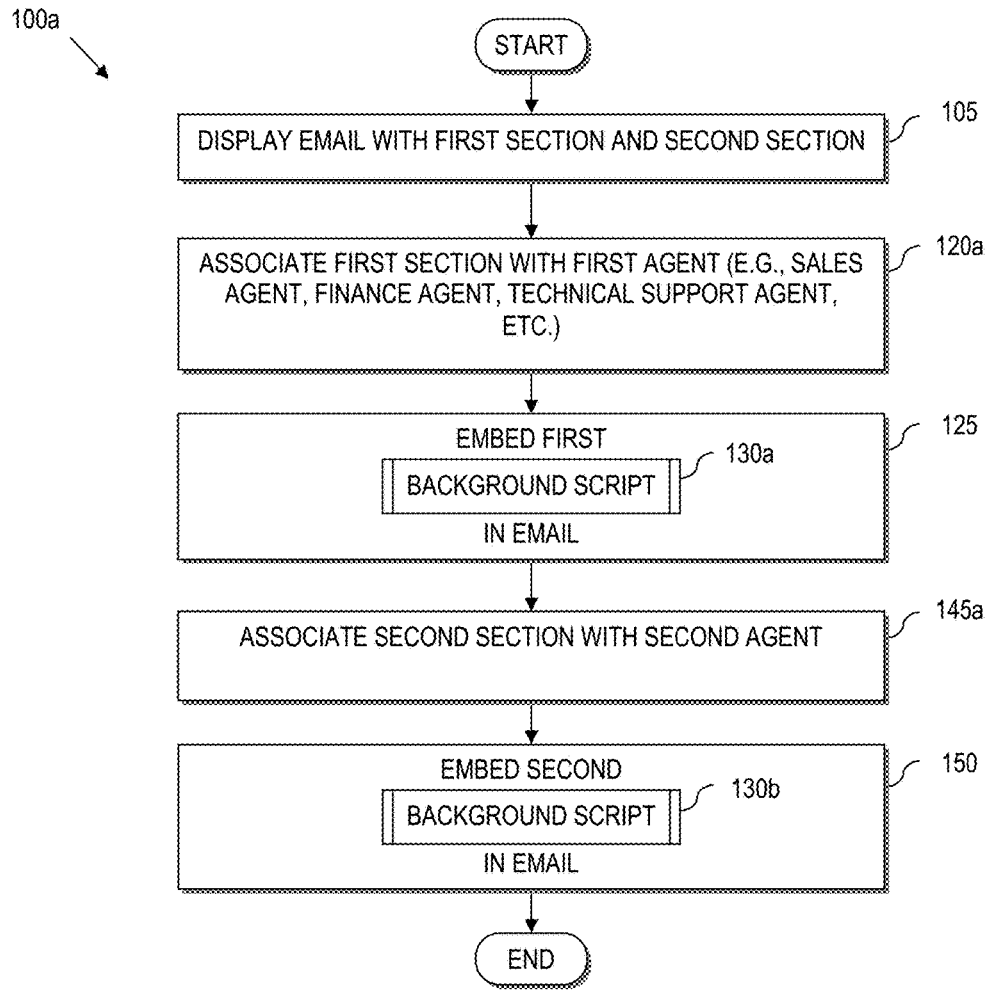
FIGS. 1A and 1B (collectively designated as FIG. 1) are flowcharts showing one embodiment of a process for embedding a background script in an email message.

Typically, in customer service environments, when an issue cannot be resolved immediately by a first-round customer service representative or an agent, that issue escalates to a next level where a manager (or other personnel with more authority to resolve the issue) is enlisted to help resolve the issue for the customer. For telephone support, which occurs in near-real-time, there are fewer barriers to escalation because the first-round agent can simply add a manager to a conference call. Similarly, in an online chat environment, a customer service agent can join others to the chat session almost instantly.

Email is likewise an important medium for a contact center to provide customer service. However, unlike near-real-time media (e.g., online chat or telephone), email does not permit immediate and direct contact with a customer service agent to resolve issues but, instead, typically requires a customer to await an email response from a customer service agent at some time in the future. In other words, it is a challenge to provide near-real-time customer support directly from a non-real-time medium, such as email.

To address this challenge, the present disclosure provides a mechanism that permits near-real-time customer service directly from an email message. Specifically, this disclosure provides a computerized system that determines when a particular segment of an email message is being viewed by a recipient or viewer (e.g., customer). Depending on the segment being viewed, the system determines whether or not various agents associated with the segment are available. Thereafter, the system provides options to a viewer for communicating with one or more available agents. These processes are accomplished by embedding a background script within an email message, which permits near-real-time addressing of issues directly from the email message.

Having provided a broad description of some embodiments, reference is now made in detail to the description of the embodiments as illustrated in the drawings. Specifically, FIGS. 1A through 6 provide various embodiments of processes that permit near-real-time customer support from an email message; FIGS. 7A through 7E show examples of how a background script is embedded into an email message; FIGS. 8 through 10 show examples of how the embedded background script is executed when a recipient or viewer (such as a customer) views the email message; and FIG. 11 shows an example embodiment of a computer system in which the embodiments of FIGS. 1A through 10 are implemented. Although several embodiments are described in connection with these drawings, there is no intent to limit the disclosure to the embodiment or embodiments disclosed herein. On the contrary, the intent is to cover all alternatives, modifications, and equivalents.

Figure 1B:
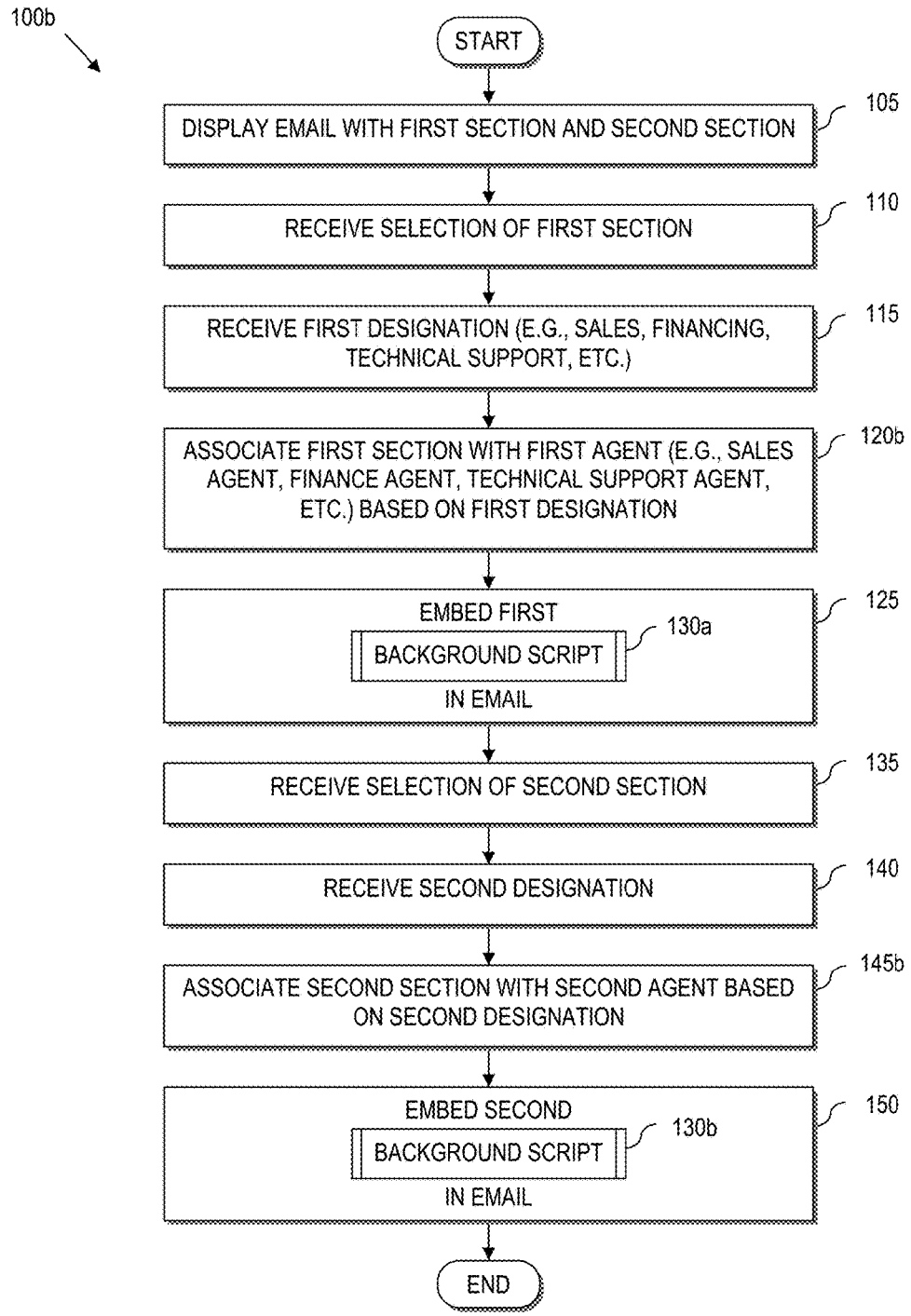

FIG. 1A is a flowchart showing one embodiment of a process 100a for embedding a background script in an email message and FIG. 1B is a flowchart showing another embodiment of a process 100b for embedding a background script in an email message. FIGS. 1A and 1B are designated collectively as FIG. 1.

As shown in FIG. 1A, the process 100a first displays 105 to a user an email with a plurality of sections (e.g., a first section, a second section, etc.). The process 100a next associates 120a the first section with a first agent (e.g., sales agent, financing agent, technical support agent, business associate, organization associate, human resources agent, legal agent, customer support agent, etc.). The process 100a next embeds 125 a background script 130a in the email, preferably in the selected first section. The background script 130a is launchable after a recipient opens the email. Various embodiments of the background script 130a are described in greater detail in FIGS. 2 through 4.

Once the background script 130a has been embedded 125 in the first section, the process 100a next associates 145a the second section with a second agent. In other words, the plurality of sections is associated 120a, 145a with a plurality of agents, and each section from the plurality of sections is associated 120a, 145a with at least one agent from the plurality of agents. Similar to the first section, a background script 130b is embedded 150 in the email, preferably in the selected second section. Again, the background script 130b is launchable after a recipient opens the email.

As shown in FIG. 1A, by allowing various agents to be associated 120a, 145a with corresponding segments of a displayed 105 email, the process 100a of FIG. 1A allows for launching of near-real-time support directly from an email message.

FIG. 1B is a flowchart showing another embodiment of a process 100b for embedding a background script in an email message. Although similar to FIG. 1A, the embodiment of FIG. 1B shows additional process steps. As shown in FIG. 1B, the process 100b first displays 105 to a user an email with a plurality of sections (e.g., a first section, a second section, etc.). Displaying 105 the email to the user permits the user to select various sections of the email message and embed appropriate background scripts in various segments of the email message.

The process 100b then receives 110 a first selection (of a first section of the email message) and, also, receives 115 a first designation. The first designation categorizes the first section as, for example, sales, financing, technical support, business, organization, legal, human resources, customer support, etc.

The first section is then associated 120b with a first agent based on the first designation. For example, if the first section is designated as a sales section, then the first section is associated 120b with a sales agent. Likewise, if the first section is designated as a financing section, then the first section is associated 120b with a financing agent. As one can appreciate, the process 100b works similarly for a technical support section (associated 120b with a technical support agent), a business section (associated 120b with a business associate), an organization section (associated 120b with an organization associate), a legal section (associated 120b with a legal agent), a human resources section (associated 120b with a human resources agent), a customer support section (associated 120b with a customer support agent), etc.

The process 100b next embeds 125 a background script 130a in the email, preferably in the selected first section. The background script 130a is launchable after a recipient opens the email. Various embodiments of the background script 130a are described in greater detail in FIGS. 2 through 4.

Once the background script 130a has been embedded 125 in the first section, the process 100b next receives 135 a selection of a second section and, also, receives 140 a second designation. Similar to the first section, the second section is associated 145b with a second agent based on the second designation. For example, if the second section is designated as a sales section, then the second section is associated 145b with a sales agent; a financing section with a financing agent; a technical support section with a technical support agent; a business section with a business associate; an organization section with an organization associate; a legal section with a legal agent; a human resources section with a human resources agent; a customer support section with a customer support agent; etc. In other words, the plurality of sections is associated 120b, 145b with a plurality of agents, and each section from the plurality of sections is associated 120b, 145b with at least one agent from the plurality of agents.

Similar to the first section, a background script 130b is embedded 150 in the email, preferably in the selected second section. Again, the background script 130b is launchable after a recipient opens the email.

As shown in FIG. 1B, by allowing various agents to be associated 120b, 145b with corresponding segments of a displayed 105 email based on selections 110, 135 and corresponding designations 115, 140, the process 100b of FIG. 1B allows for launching of near-real-time support directly from an email message.

With this in mind, attention is turned to FIGS. 2 through 6, which provide various embodiments of the background script 130a, 130b (collectively designated as 130), and processes contained therein.

Figure 2:
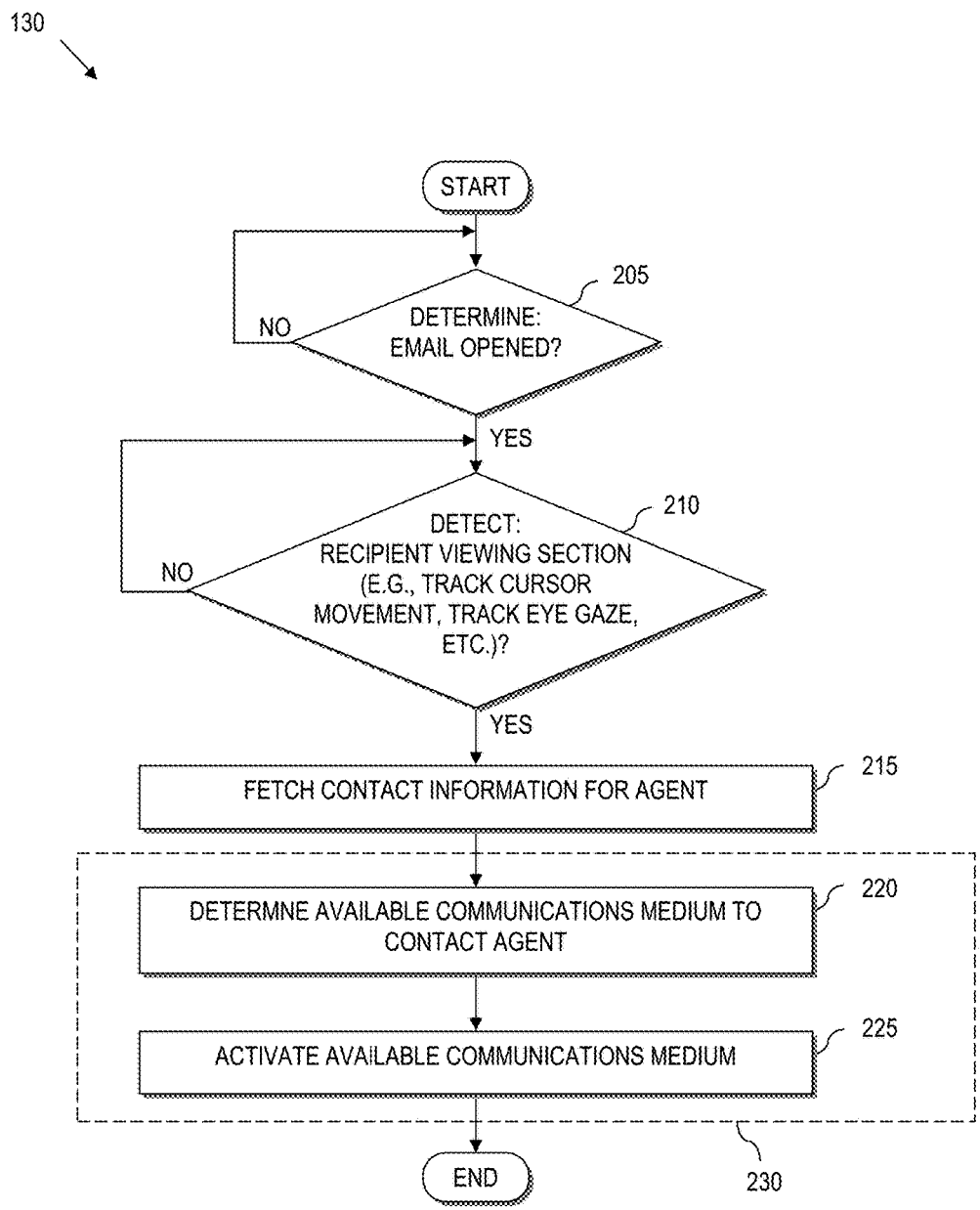
FIG. 2 is a flowchart showing one embodiment of the background script of FIG. 1, including a process that provides an option to contact an agent.

FIG. 2 is a flowchart showing one embodiment of the background script 130 of FIG. 1, including a near-real-time process to contact an agent. As shown in FIG. 2, the background script 130 is configured to determine 205 whether or not the email message has been opened by a recipient (also designated as a viewer or customer). If the background script 130 determines 205 that the email message has been opened by the recipient, then the background script 130 next detects 210 whether or not the recipient is viewing a particular section or segment of the email message. For some embodiments, the detection 210 is done by tracking cursor movement of the recipient, while in other embodiments, the detection 210 is done by tracking eye gaze of the recipient, while in yet other embodiments the detection 210 is done by tracking touch-screen activity by the recipient. Insofar as tracking cursor movement, eye gaze, and touch-screen activity is known in the art, details relating to these types of tracking mechanisms are omitted herein. However, it should be noted that by employing such tracking mechanisms (or other similarly-known tracking mechanisms), the background script 130 detects 210 which of the sections the recipient is accessing at any given moment.

Upon detecting 210 which section the recipient is accessing (or viewing), the background script 130 fetches 215 contact information for the agent(s) associated with the section that the recipient is accessing (or viewing). Thereafter, the background script 130 determines 220 which communication medium (e.g., telephone, online chat, email, etc.) is available to contact the agent(s). Thereafter, the background script 130 activates 225 the available communication medium (or media). If it is determined 220 that one or more communication media are available to contact the agent, then all of the available communication media are activated 225. The steps of determining 220 the possible communication media and activating 225 the communication media are collectively designated as a near-real-time process 230 to contact an appropriate agent. Various embodiments of the near-real-time process 230 are shown in FIGS. 3 and 4.

Figure 3:
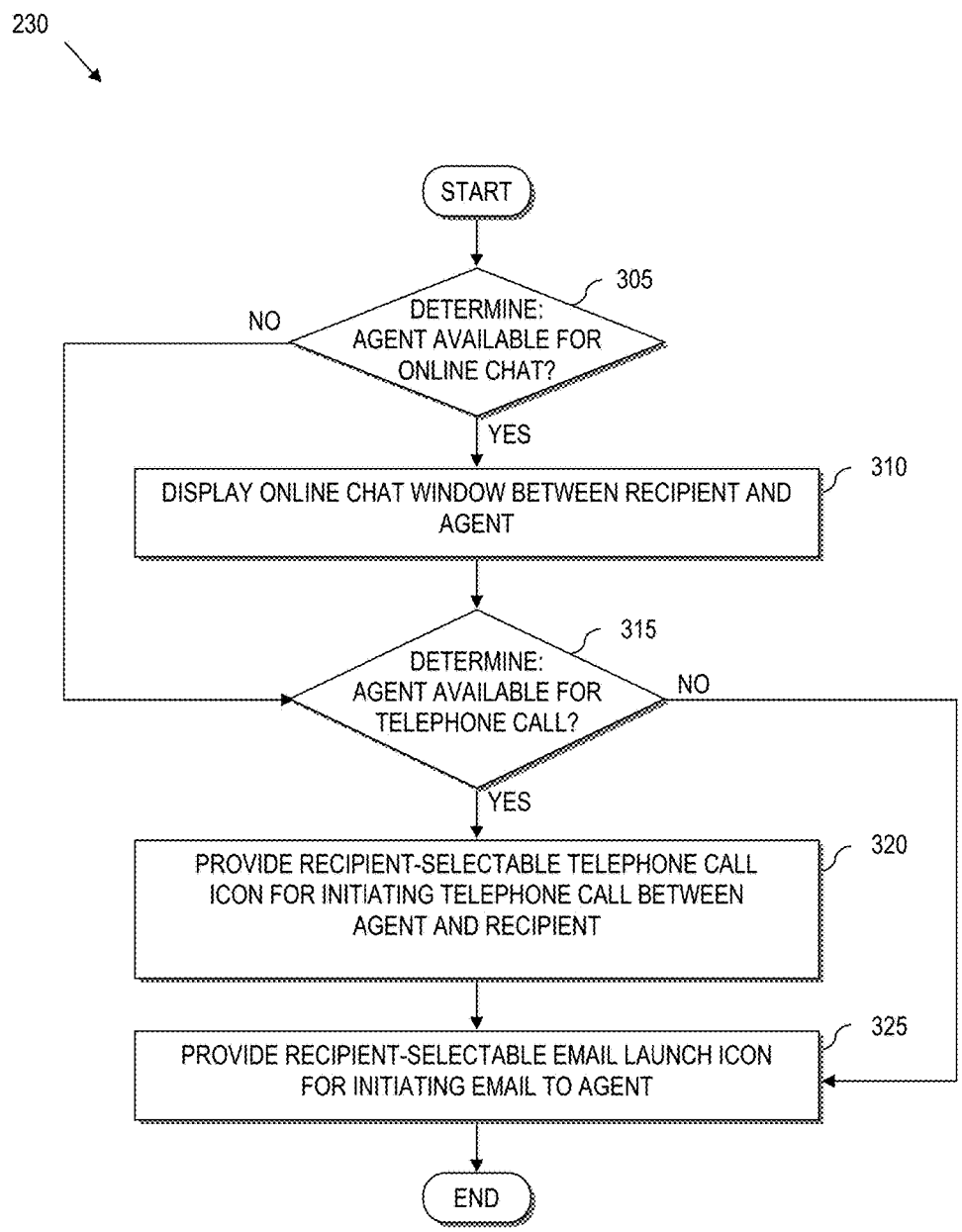
FIG. 3 is a flowchart showing one embodiment of a near-real-time process to contact an agent.

FIG. 3 is a flowchart showing one embodiment of the near-real-time process 230 of FIG. 2. As shown in FIG. 3, the near-real-time process 230 determines 305 whether or not the agent (who is designated for the section being viewed by the recipient) is available for an online chat session. If the agent is available for an online chat session, then the near-real-time process 230 displays 310 an online chat window between the recipient of the email and the available agent. If, however, no agent is available for an online chat session, then the near-real-time process 230 determines 315 whether or not the agent is available for a telephone call. If the agent is available for a telephone call, then the near-real-time process 230 provides 320 a recipient-selectable telephone call icon for initiating a telephone call between the recipient and the agent. If, however, no agent is available for a telephone call, then the near-real-time process 230 provides 325 a recipient-selectable email launch icon for initiating an email response from the recipient to the agent. Stated differently, the near-real-time process 230 determines whether or not the agents are available for an online chat, available for a telephone call, or available by email. From this, the near-real-time process 230 displays an appropriate communication medium for the recipient to contact the agent.

Figure 4:
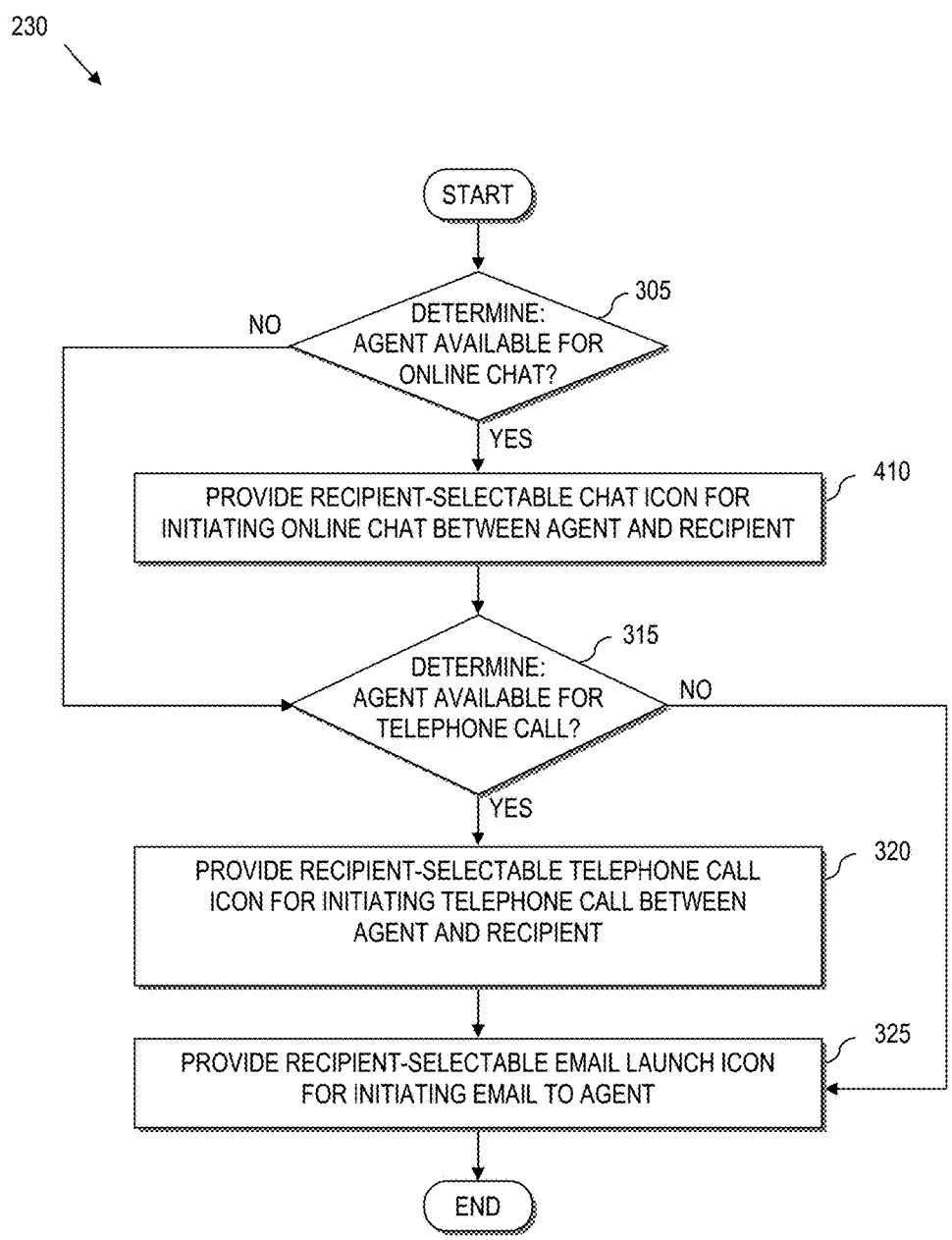
FIG. 4 is a flowchart showing another embodiment of a near-real-time process to contact an agent.

FIG. 4 is a flowchart showing another embodiment of the near-real-time process 230 of FIG. 2. Similar to FIG. 3, the near-real-time process 230 of FIG. 4 determines 305 whether or not the agent is available for an online chat session. If the agent is available for an online chat session, then the near-real-time process 230 provides 410 a recipient-selectable chat icon for initiating an online chat session between the recipient and the available agent. If, however, no agent is available for an online chat session, then the near-real-time process 230 proceeds forward in the same manner as in FIG. 3. Insofar as the remainder of the process is discussed with reference to FIG. 3, further discussions of the remaining process steps of FIG. 4 are omitted.

As shown from FIGS. 1 through 4, by associating various sections of an email message with specific agents and by providing a mechanism to embed background scripts within various portions of the email message, the processes of FIGS. 1 through 4 provide mechanisms that permit email recipients to contact available context-specific agents in near-real-time directly from the email message itself.

Figure 5:
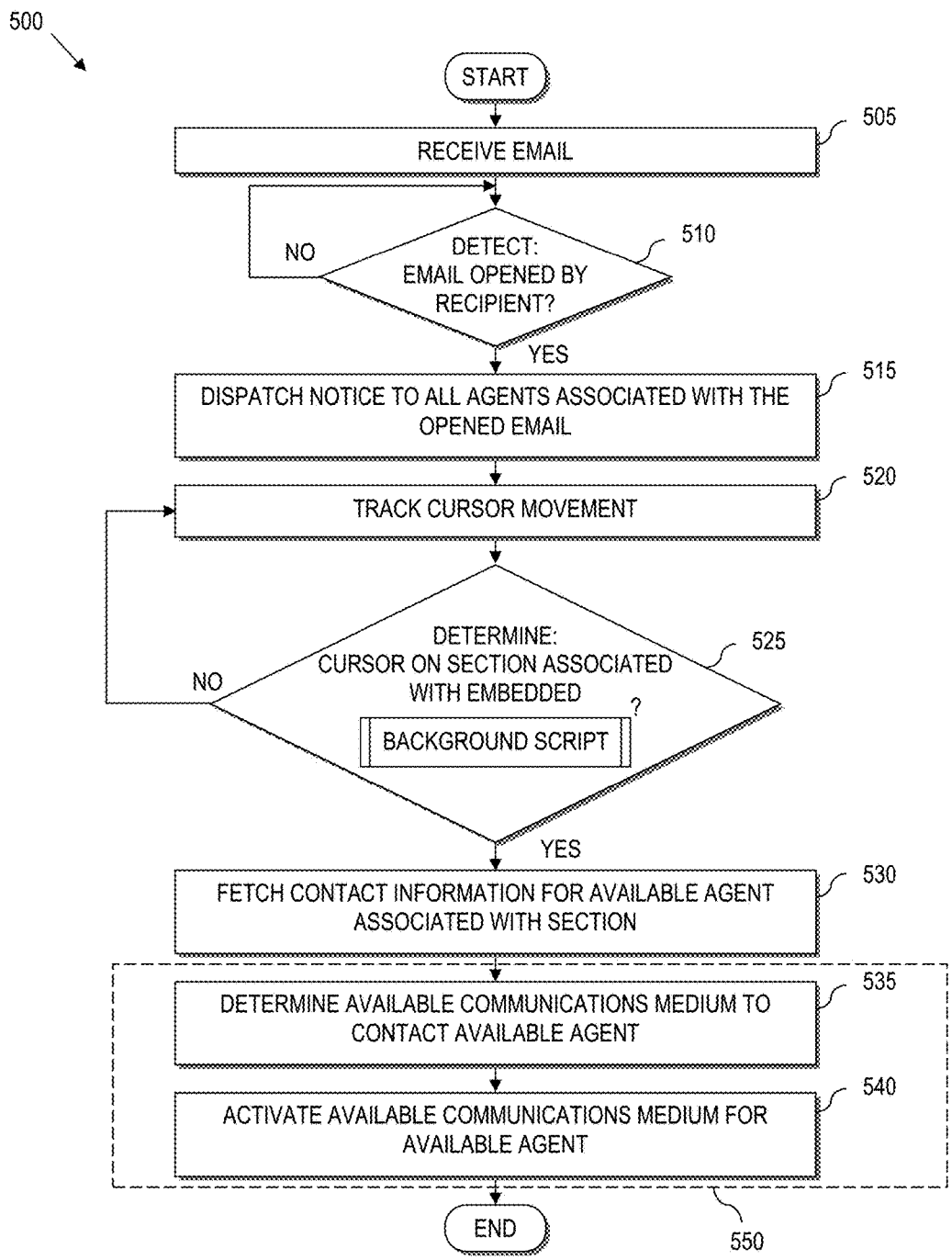
FIG. 5 is a flowchart showing one embodiment of a process for detecting a section of an email message being accessed or viewed by a recipient.
Figure 6:
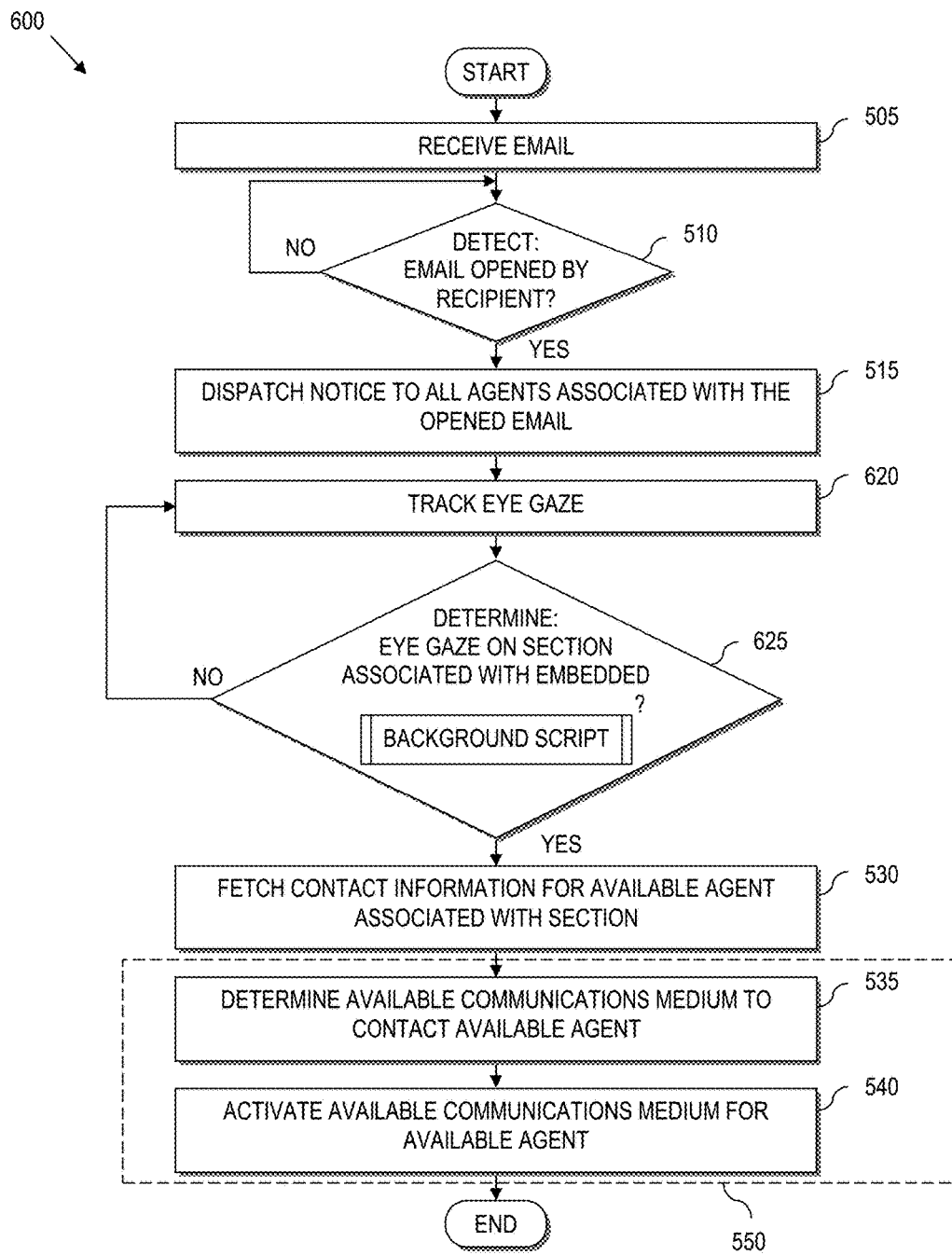
FIG. 6 is a flowchart showing another embodiment of a process for detecting a section of an email message being accessed or viewed by a recipient.

Having described processes for creating the email message with embedded scripts 130, FIGS. 5 and 6 show embodiments of processes that occur when the recipient opens the email and accesses its contents. Specifically, FIG. 5 is a flowchart showing one embodiment of a process 500 for determining a section of an email message being accessed or viewed by a recipient. As shown in FIG. 5, the process 500 begins when the recipient receives 505 the email message. The process 500 detects 510 whether or not the email (with the designated sections) has been opened by the recipient. When the email is opened and the contents are displayed to the recipient, the process 500 dispatches 515 a notice to all of the agents that are associated with the displayed email. Thereafter, the process 500 tracks 520 cursor movement as the recipient scrolls through the email message. As the cursor moves, the process 500 determines 525 whether or not the cursor is on a section that has been associated with a particular background script. If the cursor is on the section with the particular background script, then the process 500 fetches 530 contact information for all available agents associated with that section, determines 535 all available communications media to contact those available agents, and then activates 540 the available communications media for the available agents. Similar to the processes of FIGS. 2 through 4, the steps of determining 535 available communications media and activating 540 the communications media provide for near-real-time processes 550.

FIG. 6 is a flowchart showing another embodiment of a process 600 for determining a section of an email message being accessed or viewed by a recipient. Similar to FIG. 5, the process 600 of FIG. 6 begins when the recipient receives 505 the email message. The process 600 then detects 510 whether or not the email (with the designated sections) has been opened by the recipient. When the email is opened and the contents are displayed to the recipient, the process 600 dispatches 515 a notice to all of the agents that are associated with the displayed email. Thereafter, the process 600 tracks 620 eye gaze as the recipient views various sections of the email message. Based on the eye gaze, the process 600 determines 625 whether or not the recipient is accessing a section that has been associated with the particular background script that has been embedded in that section. If the eye gaze is on the section with the embedded background script, then the process 600 fetches 530 contact information for all available agents associated with that section, and the process 600 continues in a manner similar to the process 500 of FIG. 5.

As shown from FIGS. 5 and 6, the embedded background scripts allow email recipients to contact available context-specific agents in near-real-time directly from the email message itself.

Figure 7A:
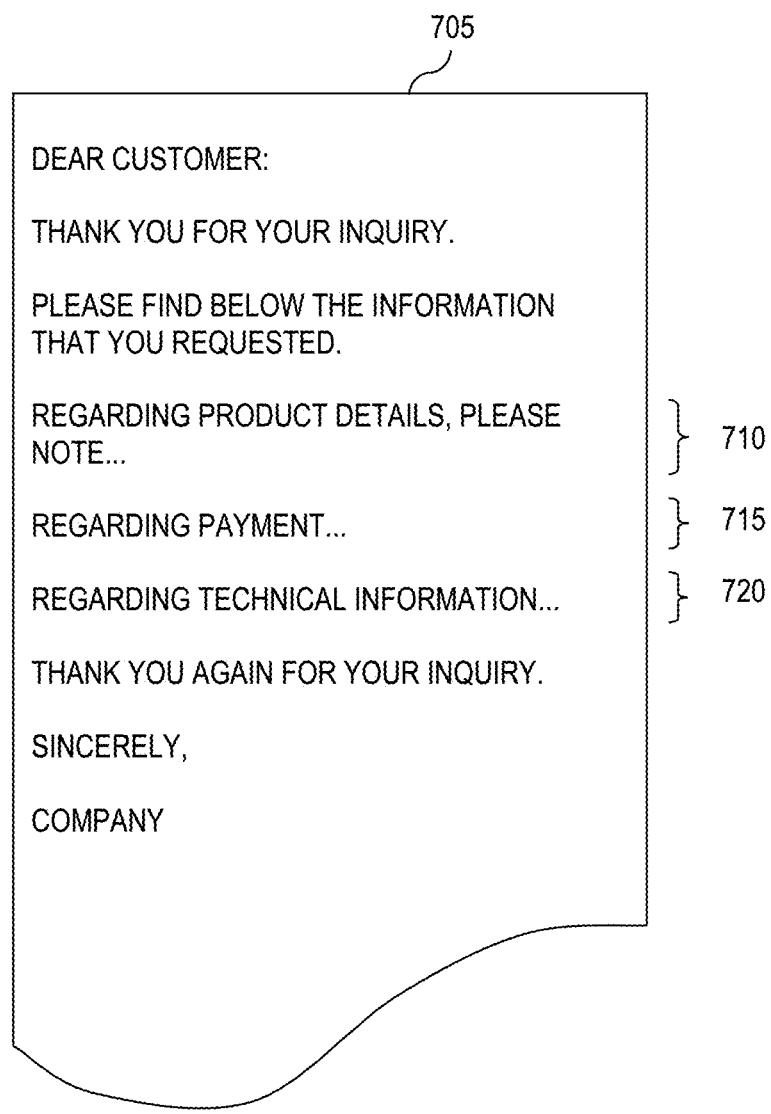
FIG. 7A is a diagram showing one embodiment of an email message with multiple sections.
Figure 7B:
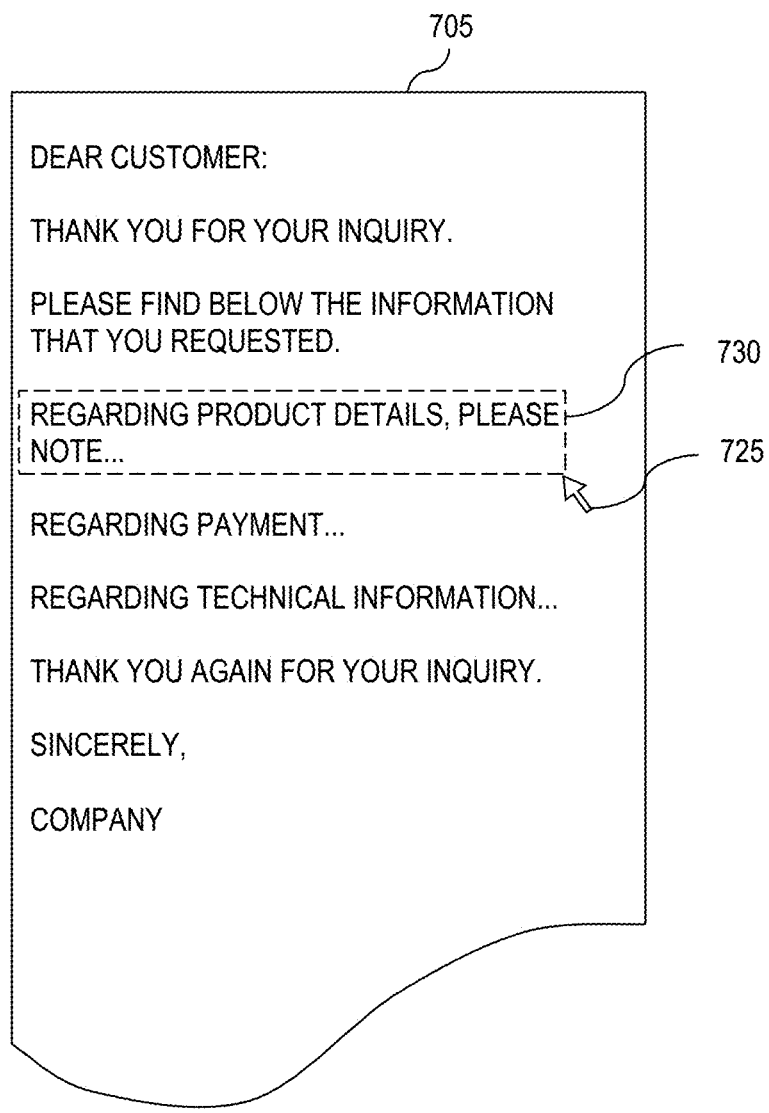
FIG. 7B is a diagram showing one embodiment in which a section of the email of FIG. 7A is selected for embedding a background script of FIG. 1.
Figure 7C:
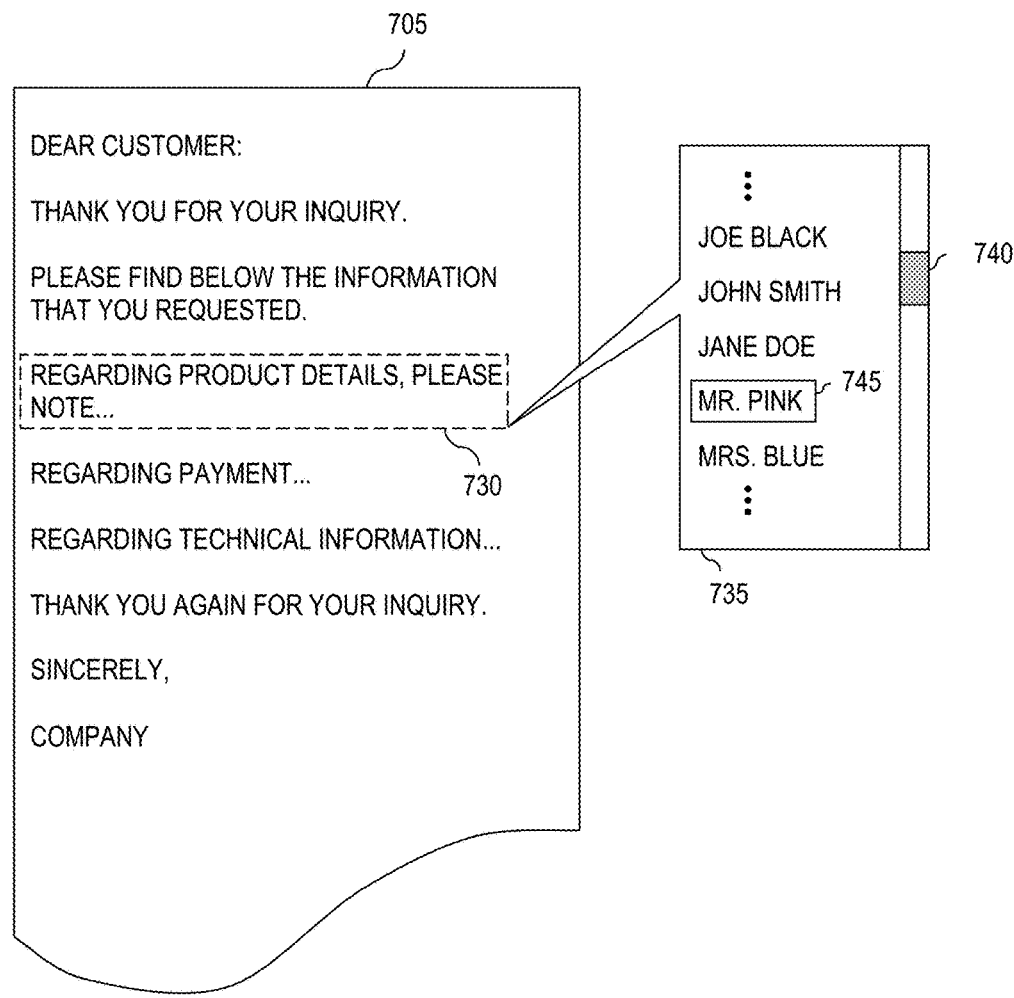
FIG. 7C is a diagram showing one embodiment in which an agent is associated with the selected section of FIG. 7B.
Figure 7D:
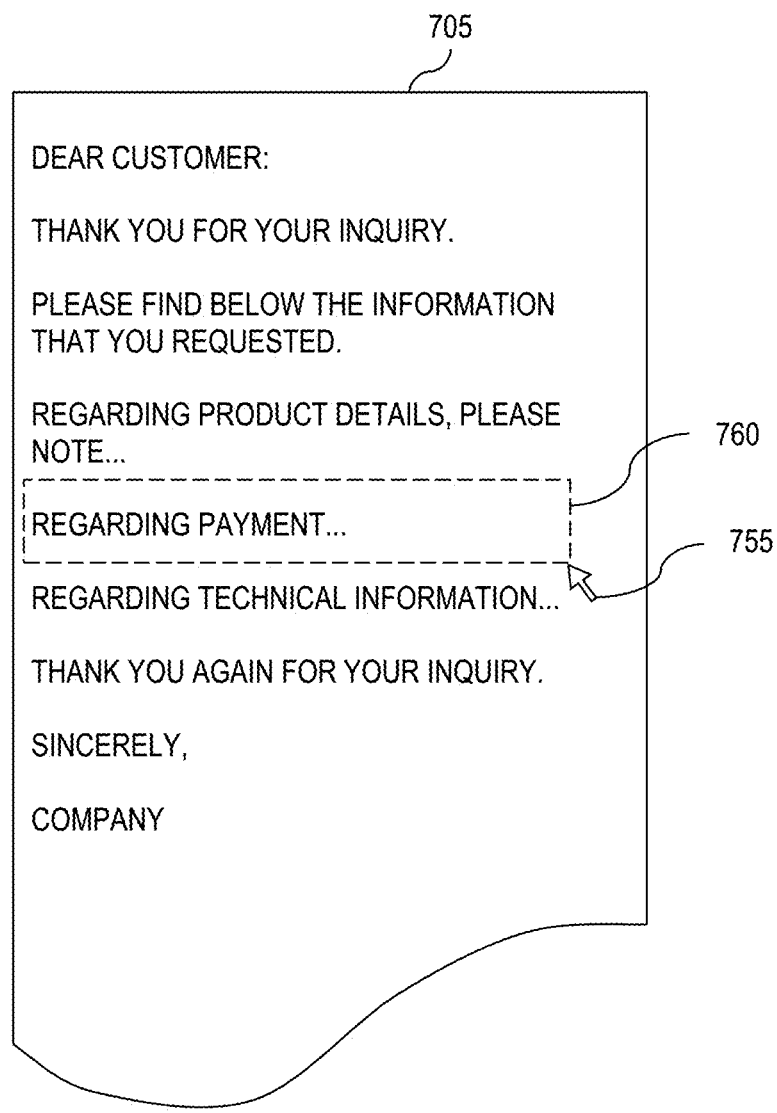
FIG. 7D is a diagram showing one embodiment in which another section of the email of FIG. 7A is selected for embedding a background script of FIG. 1.
Figure 7E:
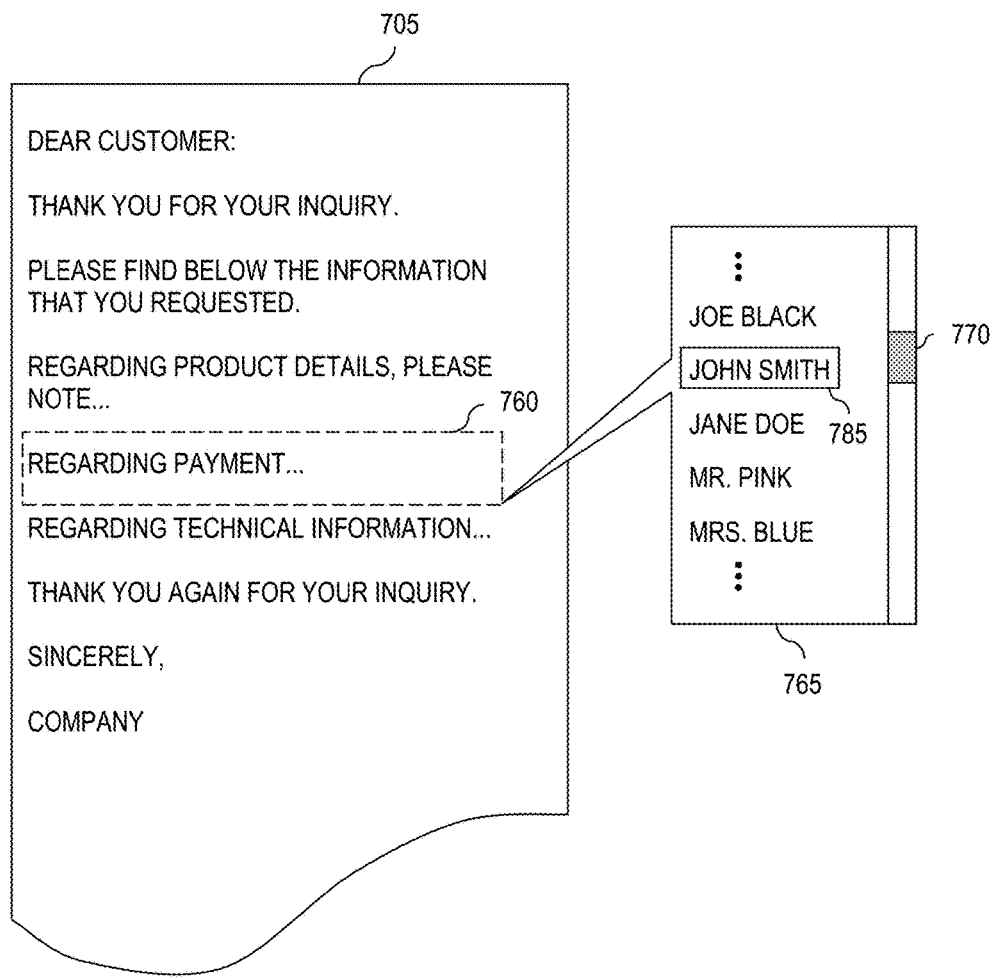
FIG. 7E is a diagram showing one embodiment in which an agent is associated with the selected section of FIG. 7D.
Figure 8:
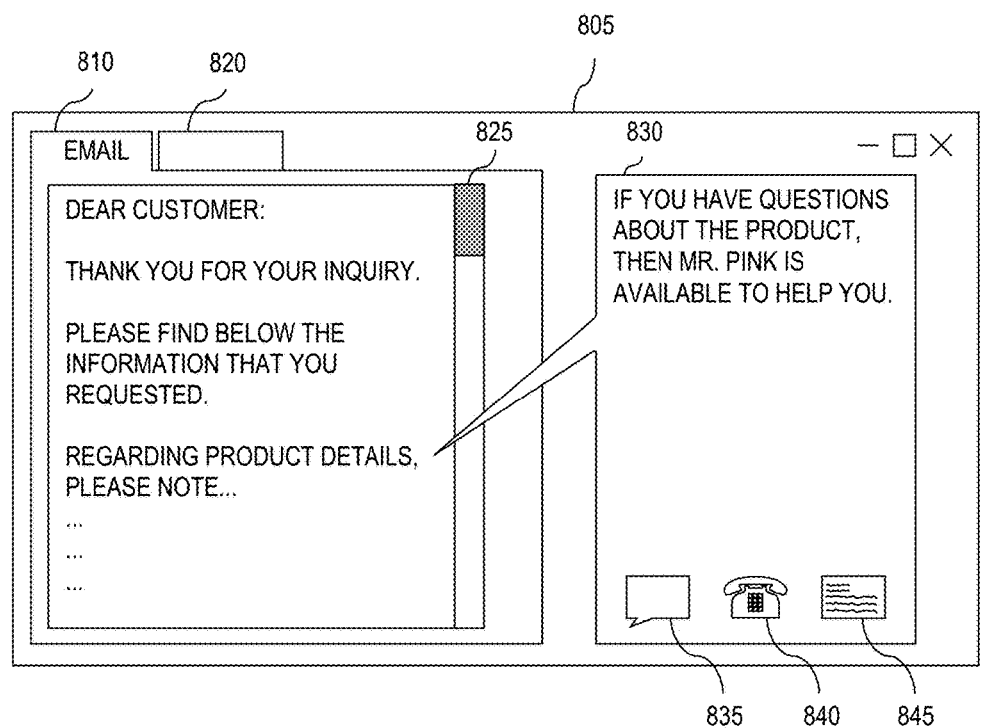
FIG. 8 is a diagram showing the section of the email message of FIGS. 7B and 7C being viewed by a recipient.
Figure 9:
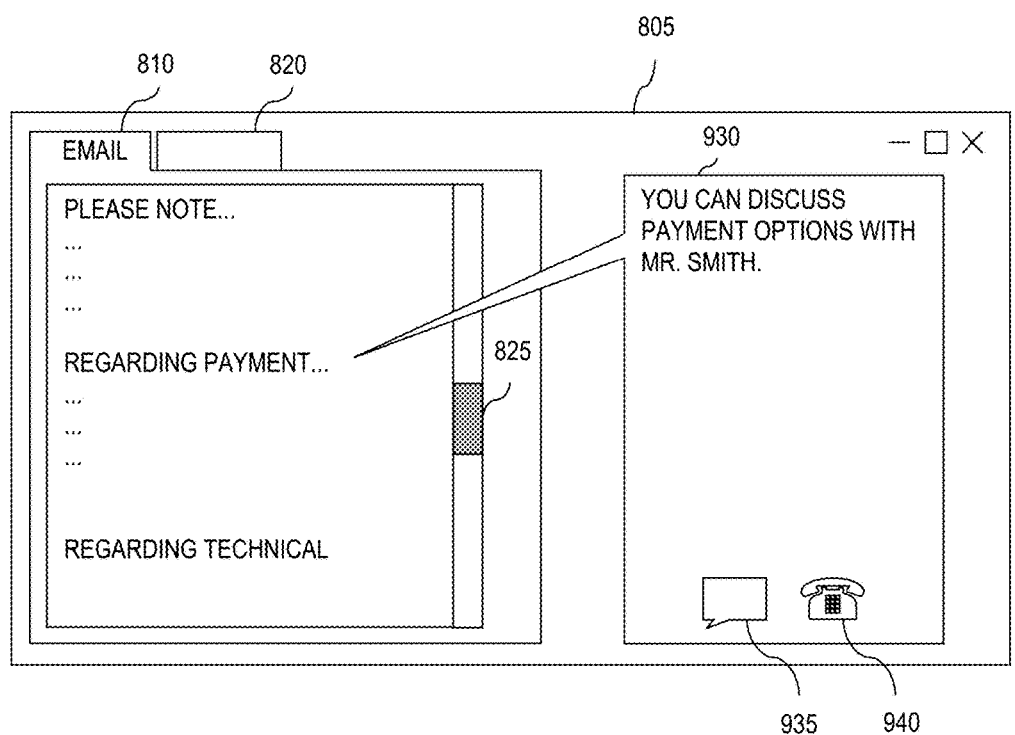
FIG. 9 is a diagram showing the section of the email message of FIGS. 7D and 7E being viewed by the recipient.
Figure 10:
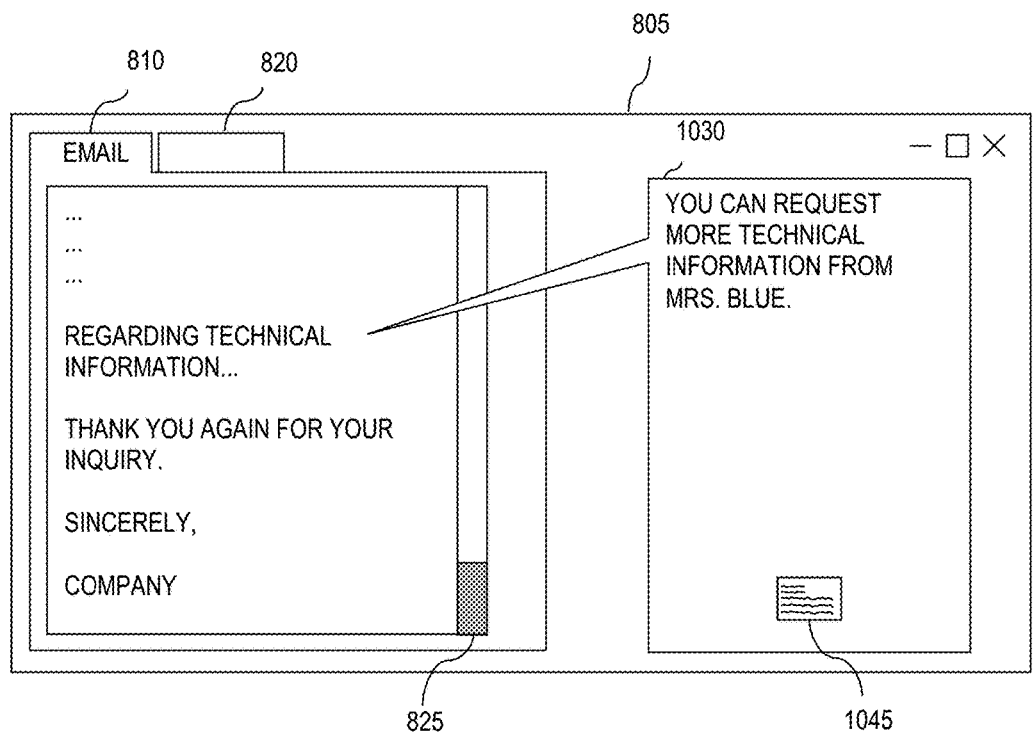
FIG. 10 is a diagram showing the last section of the email message of FIG. 7A being viewed by the recipient.
Figure 11:
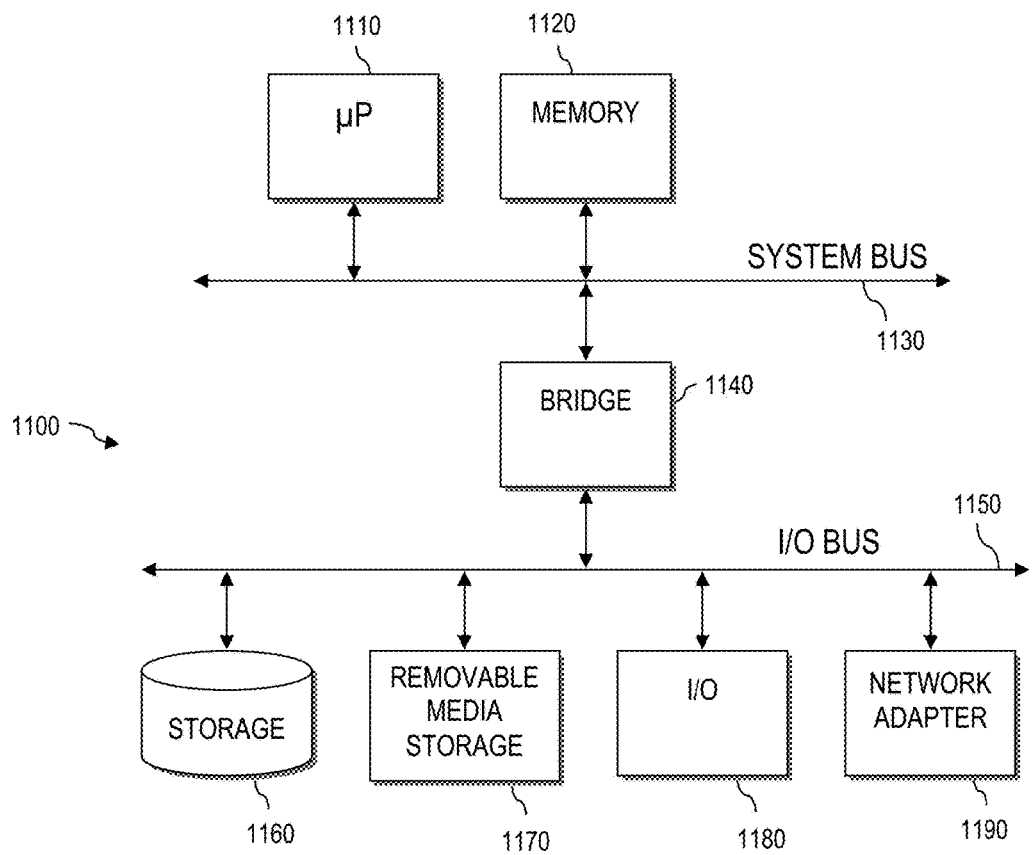
FIG. 11 is a schematic diagram showing one embodiment of a computer system comprising computer readable program code for executing any aspects described herein with regard to FIGS. 1 through 10.

For clarity, specific examples that implement the embodiments of FIGS. 1 through 6 are shown with reference to FIGS. 7A through 10. For example, FIG. 7A is a diagram showing one embodiment of an email message 705 with multiple sections 710, 715, 720, in which a user can embed context-specific background scripts. For illustrative purposes, the first section 710 begins with text that recites "regarding product details, please note . . . ;" the second section 715 begins with "regarding payment . . . ;" and the third section 720 begins with "regarding technical information . . . ." Broadly, as shown in FIG. 7A, upon displaying an email message 705 with multiple sections 710, 715, 720, each section is associated with a corresponding agent, and a background script (launchable after a recipient opens the email message 705) is embedded in the email message 705. The background script detects which section 710, 715, 720 the recipient is accessing, fetches contact information for the corresponding agent, determines a communication medium to contact the corresponding agent, and activates the communication medium. Specific embodiments of this process are set forth below.

By way of example, continuing with FIG. 7B, the "product details" section can be selected 730 using a cursor 725, which either highlights or otherwise delineates the "product details" section. After selecting the "product details" section, a list 735 of agents is displayed to the user as shown in FIG. 7C. This permits the user to scroll through the list 735 using a scroll bar 740 and select an appropriate agent 745 to associate with "product details" (the appropriate agent 745 for "product details" is shown here as Mr. Pink). In some embodiments, in addition to displaying the agent's name (e.g., Mr. Pink), the list 735 also displays the agent's areas of expertise (e.g., product details) so that the user can readily determine which agent would be appropriate for the selected section. In other embodiments, only the agents that are relevant to the selected section (e.g., product details) are displayed on the list 735 and, thus, every agent that is displayed has expertise in the particular area. In yet other embodiments, the user finds the appropriate agent through a directory or other similar mechanism.

Continuing to FIG. 7D, the user can next select the "payment" section 760 using the cursor 755. Upon selection, another list 765 of agents is displayed to the user. The user can, again, scroll through the list 765 using a scroll bar 770 and select an appropriate agent 785 to associate with "payment" (the appropriate agent 785 for "payment" is shown here as John Smith). As one can appreciate, different sections of an email message are separately selectable and can be separately designated and separately associated with one or more different agents. Each selection and designation embeds a background script that is launchable when the recipient accesses the section. Insofar as the general process for embedding background scripts is known in the art, discussions relating to how the scripts are embedded are omitted herein.

Continuing, FIGS. 8 through 10 are diagrams showing execution of the background scripts as the recipient accesses various sections of the email message. Specifically, FIG. 8 shows a browser 805 in which an email message 810 is opened along with other browser tabs 820. In the embodiment of FIG. 8, when the recipient uses the browser scroll bar 825 to access the "product details" section, the background script displays to the recipient a dialogue window 830, which indicates that Mr. Pink (who was previously designated as the "product details" agent in FIG. 7C) is available to help. Specifically, the dialogue window 830 provides a recipient-selectable online chat icon 835, a recipient-selectable telephone icon 840, and a recipient-selectable email launch icon 845, each of which can be selected by the recipient to contact Mr. Pink directly.

Continuing, in the embodiment of FIG. 9, when the recipient uses the browser scroll bar 825 to access the "payment" section, the background script displays to the recipient another dialogue window 930, which indicates that Mr. Smith (who was previously designated as the "payment" agent in FIG. 7E) is available to help. Unlike the embodiment of FIG. 8, the dialogue window 930 provides only a recipient-selectable online chat icon 935 and a recipient-selectable telephone icon 940, each of which can be selected by the recipient to contact Mr. Smith directly. In other words, although the background script may have determined that Mr. Pink (from FIG. 8) was available by online chat, telephone, and email for assistance on product details, the background script determined that Mr. Smith (in FIG. 9) is only available by online chat or telephone (but not by email), thereby displaying to the recipient only the recipient-selectable online chat icon 935 and the recipient-selectable telephone icon 940 (but no recipient-selectable email launch icon).

Continuing, in the embodiment of FIG. 10, when the recipient uses the browser scroll bar 825 to access the "technical information" section, the background script displays to the recipient another dialogue window 1030, which indicates that Mrs. Blue is available to help. Unlike the embodiments of FIG. 8 or FIG. 9, the dialogue window 1030 provides only a recipient-selectable email launch icon 1045, thereby showing to the recipient that (at that particular moment) assistance for technical information is available from Mrs. Blue by email only.

As one can appreciate from FIGS. 8 through 10, by associating various sections of an email message with different customer service representatives or agents (along with different communications media by which those agents are available), and by embedding background scripts that determine in near-real-time the availability of the various agents when a recipient opens an email message, the embodiments of FIGS. 8 through 10 permit near-real-time assistance directly from the email message itself.

Having discussed various embodiments that permit near-real-time assistance directly from an email message itself, FIG. 11 is a schematic diagram showing one embodiment of a computer system comprising computer readable program code for executing any aspects described herein with regard to FIGS. 1 through 10. As shown in FIG. 11, one embodiment of a computer system 1100 includes one or more microprocessors 1110 that are connected to memory 1120 via a system bus 1130. A bridge 1140 connects the system bus 1130 to an I/O Bus 1150 that links peripheral devices to the microprocessor(s) 1110. Peripherals may include storage 1160, such as a hard drive, removable media storage 1170, e.g., tape drive, floppy, flash, CD and/or DVD drive, I/O device(s) 1180 such as a keyboard, mouse, etc., and a network adapter 1190. In this regard, the microprocessor(s) 1110 may thus read computer instructions stored in the memory 1120, storage 1160, removable media storage 1170, or combinations thereof, to implement one or more of the aspects, as set out in greater detail herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A process comprising:
   displaying to a user other than a recipient of an email, by a computer system, the email, the email comprising a plurality of sections;
   associating, by the computer system, the plurality of sections with a plurality of agents, wherein each section from the plurality of sections is associated with at least one agent from the plurality of agents;
   receiving, by the computer system, input indicating a plurality of selected sections from among the plurality of sections;
   embedding, by the computer system, a respective background script in the email for each of the selected sections, each background script being launchable after the recipient opens the email, each background script, when launched, for:
  detecting which section from the plurality of sections the recipient is accessing;
  fetching contact information for the at least one agent associated with the section that the recipient is accessing;
  determining one or more communication media to contact the at least one agent associated with the section that the recipient is accessing; and
  activating the one or more communication media to contact the at least one agent based on the section that the recipient is accessing.

2. The process of claim 1, wherein determining one or more communication media is one selected from the group consisting of:
  determining whether the at least one agent associated with the section that the recipient is accessing is available for an online chat;
  determining whether the at least one agent associated with the section that the recipient is accessing is available for a telephone call; and
  determining whether the at least one agent associated with the section that the recipient is accessing is available by email.

3. The process of claim 2, wherein activating one or more communication media comprises:
  displaying an online chat window between the recipient and the at least one agent associated with the section that the recipient is accessing in response to determining that the at least one agent associated with the section that the recipient is accessing is available for an online chat;
  displaying a recipient-selectable telephone call icon for initiating a telephone call between the at least one agent associated with the section that the recipient is accessing and the recipient in response to determining that the at least one agent associated with the section that the recipient is accessing is available for a telephone call; and
  displaying a recipient-selectable email icon for initiating an email message to the at least one agent associated with the section that the recipient is accessing, wherein the email message includes a reference to the first section.

4. The process of claim 1, wherein the plurality of sections comprises one selected from the group consisting of:
  a section relating to sales;
  a section relating to finance;
  a section relating to business/organization;
  a section related to legal;
  a section related to human resource; and
  a section relating to customer support; and
wherein the plurality of agents comprises one selected from the group consisting of:
  a sales agent;
  a finance agent;
  a business/organization agent;
  a legal agent;
  a human resource agent; and
  a customer support agent.

5. The process of claim 1, wherein associating the plurality of sections with a plurality of agents comprises associating a first section with a sales agent, and wherein fetching contact information comprises fetching contact information for the sales agent.

6. The process of claim 1, wherein associating the plurality of sections with a plurality of agents comprises associating a first section with a finance agent, and wherein fetching contact information comprises fetching contact information for the finance agent.

7. The process of claim 1, wherein associating the plurality of sections with a plurality of agents comprises associating a first section with a customer support agent, and wherein fetching contact information comprises fetching contact information for the customer support agent.

8. The process of claim 1, wherein detecting which section from the plurality of sections a recipient is accessing comprises a step selected from the group consisting of:
  tracking cursor movement of the recipient;
  tracking eye gaze of the recipient; and
  tracking touch-screen activity by the recipient.

9. A process comprising:
  displaying, by a computer system, an email having sections;
  associating, by the computer system, each section with a corresponding agent, the corresponding agent comprising one or more individuals;
  receiving, by the computer system, input indicating a plurality of selected sections from among the sections;
  embedding, by the computer system, a respective background script in the email for each of the selected sections, each background script being launchable after a recipient opens the email, each background script, when launched, for:
    detecting which section the recipient is accessing;
    fetching contact information for the corresponding agent of the section the recipient is accessing;
    determining a communication medium to contact the corresponding agent of the section the recipient is accessing; and
    activating the communication medium to contact the corresponding agent of the section the recipient is accessing.

10. A system, comprising:
  an email program for displaying, to a user other than a recipient of an email, the email, the email comprising sections;
  a processor configured to associate each section with a respective agent;
  the processor configured to receive input indicating a plurality of selected sections from among the sections of the email; and
  the processor configured to embed a respective background script in the email for each of the selected sections, each background script being launchable after the recipient opens the email, each background script, when launched, for:
    detecting which section the recipient is accessing;
    fetching contact information for the corresponding agent of the section the recipient is accessing;
    determining an available communication medium to contact the corresponding agent of the section the recipient is accessing; and
    activating the available communication medium to contact the corresponding agent of the section the recipient is accessing.

11. The system of claim 10, wherein any of the background scripts, when launched, further:
  determines whether the corresponding agent is available for an online chat; and displays an online chat window between the recipient and the corresponding agent in response to determining that the corresponding agent is available for an online chat.

12. The system of claim 10, wherein any of the background scripts, when launched, further:
   determines whether the corresponding agent is available for a telephone call; and
   displays a recipient-selectable telephone call icon for initiating a telephone call between the corresponding agent and the recipient in response to determining that the corresponding agent is available for a telephone call.

13. The system of claim 10, wherein any of the background scripts, when launched, further displays a recipient-selectable email launch icon for initiating an email message to the corresponding agent.

14. The system of claim 10, wherein the processor associates one of the sections with a sales agent.

15. The system of claim 10, wherein the processor associates one of the sections with a finance agent.

16. The system of claim 10, wherein the processor associates one of the sections with a customer support agent.

17. The system of claim 10, wherein determining an available communications medium is one selected from the group consisting of:
   determining whether the corresponding agent is available for an online chat;
   determining whether the corresponding agent is available for a telephone call;
   determining whether the corresponding agent is available by email; and
   any combination thereof.

18. The system of claim 10, wherein detecting which section the recipient is accessing comprises tracking cursor movement.

19. The system of claim 10, wherein detecting which section the recipient is accessing comprises tracking eye gaze.

20. The system of claim 10, wherein detecting which section the recipient is accessing comprises tracking touchscreen activity by the recipient.

* * * * *